United States Patent
Katzman et al.

(10) Patent No.: US 11,900,538 B2
(45) Date of Patent: Feb. 13, 2024

(54) SYSTEMS AND METHODS FOR CONSTRUCTING A DENTAL ARCH IMAGE USING A MACHINE LEARNING MODEL

(71) Applicant: SDC U.S. SmilePay SPV, Nashville, TN (US)

(72) Inventors: Jordan Katzman, Nashville, TN (US); Christopher Yancey, Nashville, TN (US)

(73) Assignee: SDC U.S. SmilePay SPV, Nashville, TN (US)

( * ) Notice: Subject to any disclaimer, the term of this patent is extended or adjusted under 35 U.S.C. 154(b) by 0 days.

(21) Appl. No.: 17/498,922

(22) Filed: Oct. 12, 2021

(65) Prior Publication Data
US 2022/0028162 A1 Jan. 27, 2022

Related U.S. Application Data

(63) Continuation of application No. 17/090,628, filed on Nov. 5, 2020, which is a continuation of application
(Continued)

(51) Int. Cl.
*G06T 17/10* (2006.01)
*G06T 7/73* (2017.01)
*A61C 7/00* (2006.01)

(52) U.S. Cl.
CPC .............. *G06T 17/10* (2013.01); *A61C 7/002* (2013.01); *G06T 7/73* (2017.01);
(Continued)

(58) Field of Classification Search
CPC . G06T 17/10; G06T 7/73; G06T 2207/10028; G06T 2207/30036; G06T 2210/56; A61C 7/002
See application file for complete search history.

(56) References Cited

U.S. PATENT DOCUMENTS

| 6,971,873 B2 | 12/2005 | Sachdeva et al. |
| 7,077,647 B2 | 7/2006 | Choi et al. |

(Continued)

FOREIGN PATENT DOCUMENTS

| CN | 106504331 | 3/2017 |
| CN | 107862738 | 3/2018 |

(Continued)

OTHER PUBLICATIONS

International Search Report and Written Opinion regarding Appl. No. PCT PCT/US2021/061997, dated Mar. 8, 2022, 15 pps.
(Continued)

*Primary Examiner* — Abderrahim Merouan
(74) *Attorney, Agent, or Firm* — Foley & Lardner LLP

(57) ABSTRACT

A method includes receiving, by a model generation engine, an image of a dental arch of a user, executing, by the model generation engine, a machine learning model that is trained to receive the image and output a representation of the image, where in at least one iteration during training, the machine learning model determines a difference between one or more features extracted from an iteration of the representation of the image and a corresponding one or more features extracted from the image, and the method further includes outputting, by the model generation engine, an output representation of the image.

30 Claims, 7 Drawing Sheets

Related U.S. Application Data

No. 16/696,468, filed on Nov. 26, 2019, now Pat. No. 10,916,053.

(52) U.S. Cl.
CPC .............. *G06T 2207/10028* (2013.01); *G06T 2207/30036* (2013.01); *G06T 2210/56* (2013.01)

(56) References Cited

U.S. PATENT DOCUMENTS

| | | | |
|---|---|---|---|
| 7,084,868 | B2 | 8/2006 | Farag et al. |
| 8,113,829 | B2 | 2/2012 | Sachdeva et al. |
| 8,152,523 | B2 | 4/2012 | Sporbert et al. |
| 8,417,366 | B2 | 4/2013 | Getto et al. |
| 8,478,698 | B1 | 7/2013 | Mah |
| 8,896,592 | B2 | 11/2014 | Boltunov et al. |
| 9,299,192 | B2 | 3/2016 | Kopelman |
| 9,566,132 | B2 | 2/2017 | Stone-Collonge et al. |
| 9,770,217 | B2 | 9/2017 | Sandholm et al. |
| 9,838,670 | B2 | 12/2017 | Glinec et al. |
| 10,074,178 | B2 | 9/2018 | Cocco et al. |
| 10,109,114 | B1 | 10/2018 | Yancey et al. |
| 10,248,883 | B2 | 4/2019 | Borovinskih et al. |
| 10,441,395 | B2 | 10/2019 | Mah |
| 10,485,638 | B2 | 11/2019 | Salah et al. |
| 10,485,639 | B2 | 11/2019 | Levin |
| 10,517,696 | B2 | 12/2019 | Kitching et al. |
| 10,624,716 | B2 | 4/2020 | Kitching et al. |
| 10,977,818 | B2* | 4/2021 | Clark .................. G06T 7/77 |
| 11,043,026 | B1 | 6/2021 | Fathi et al. |
| 2002/0028418 | A1 | 3/2002 | Farag et al. |
| 2006/0127855 | A1* | 6/2006 | Wen .................. A61C 7/04 433/213 |
| 2013/0051516 | A1* | 2/2013 | Yang .................. G06T 11/005 378/4 |
| 2013/0218530 | A1 | 8/2013 | Deichmann et al. |
| 2016/0125651 | A1 | 5/2016 | Lior et al. |
| 2016/0175068 | A1* | 6/2016 | Cai .................. A61C 7/002 700/98 |
| 2016/0210602 | A1 | 7/2016 | Siddique et al. |
| 2016/0220173 | A1* | 8/2016 | Ribnick .............. A61B 5/7278 |
| 2016/0228212 | A1 | 8/2016 | Salah et al. |
| 2017/0085863 | A1* | 3/2017 | Lopez .................. H04N 13/261 |
| 2017/0161640 | A1* | 6/2017 | Shamir .................. G06N 20/00 |
| 2017/0304950 | A1 | 10/2017 | Moore |
| 2018/0028294 | A1* | 2/2018 | Azernikov .......... G06V 10/764 |
| 2018/0085201 | A1 | 3/2018 | Wu et al. |
| 2018/0168780 | A1 | 6/2018 | Kopelman et al. |
| 2018/0168781 | A1* | 6/2018 | Kopelman ............. G16H 40/60 |
| 2018/0206940 | A1* | 7/2018 | Kopelman ............. G06T 7/0012 |
| 2018/0263731 | A1 | 9/2018 | Pokotilov et al. |
| 2018/0263732 | A1 | 9/2018 | Pokotilov et al. |
| 2018/0303581 | A1 | 10/2018 | Martz et al. |
| 2018/0344430 | A1 | 12/2018 | Salah et al. |
| 2018/0352150 | A1 | 12/2018 | Purwar et al. |
| 2018/0368943 | A1 | 12/2018 | Katzman et al. |
| 2019/0014005 | A1 | 1/2019 | Lessman |
| 2019/0026598 | A1 | 1/2019 | Salah et al. |
| 2019/0026599 | A1 | 1/2019 | Salah et al. |
| 2019/0026942 | A1 | 1/2019 | Zhang |
| 2019/0090982 | A1 | 3/2019 | Kuo |
| 2019/0090984 | A1* | 3/2019 | Martz .................. C08G 61/08 |
| 2019/0125493 | A1 | 5/2019 | Salah et al. |
| 2019/0139300 | A1 | 5/2019 | Kirchberg et al. |
| 2019/0148005 | A1 | 5/2019 | Domracheva et al. |
| 2019/0164353 | A1 | 5/2019 | Yancey et al. |
| 2019/0175303 | A1* | 6/2019 | Akopov .................. A61C 7/08 |
| 2019/0269483 | A1* | 9/2019 | Kaza .................. A61C 9/0053 |
| 2019/0282344 | A1 | 9/2019 | Azernikov et al. |
| 2019/0295223 | A1* | 9/2019 | Shen .................. G06N 3/084 |
| 2019/0313963 | A1* | 10/2019 | Hillen .................. G06N 20/00 |
| 2019/0332875 | A1 | 10/2019 | Vallespi-Gonzalez et al. |
| 2019/0333622 | A1* | 10/2019 | Levin .................. G16H 20/30 |
| 2020/0000552 | A1 | 1/2020 | Mednikov et al. |
| 2020/0031934 | A1 | 1/2020 | Gu et al. |
| 2020/0100871 | A1* | 4/2020 | Wang .................. A61C 7/08 |
| 2020/0311934 | A1 | 10/2020 | Cherkas et al. |
| 2020/0404243 | A1 | 12/2020 | Saphier et al. |
| 2020/0405464 | A1* | 12/2020 | Nikolskiy .................. G06T 7/11 |
| 2021/0117308 | A1* | 4/2021 | Burgos .................. G06F 11/3624 |
| 2021/0141986 | A1* | 5/2021 | Ganille .................. G06Q 10/04 |
| 2021/0153986 | A1* | 5/2021 | Wirjadi .................. G06T 17/10 |
| 2021/0166445 | A1* | 6/2021 | Wang .................. G06T 11/006 |
| 2021/0174604 | A1 | 6/2021 | Long et al. |
| 2021/0186659 | A1 | 6/2021 | Li et al. |
| 2022/0110723 | A1* | 4/2022 | Raby .................. G06T 19/20 |

FOREIGN PATENT DOCUMENTS

| | | |
|---|---|---|
| EP | 3 462 373 | 4/2019 |
| EP | 3 620 130 | 3/2020 |
| WO | WO-2019/002631 | 1/2019 |

OTHER PUBLICATIONS

Charrier et al., "Comparison of No-Reference Image Quality Assessment Machine Learning-based Algorithms on Compressed Images", Feb. 2015, San Francisco, California, 10 pages.

Chen et al., "Learning to Predict 3D Objects with an Interpolation-based Differentiable Renderer", https://arxiv.org/pdf/1908.01210.pdf, Nov. 21, 2019, 11 Pages.

Fan et al., "A Point Set Generation Network for 3D Object Reconstruction From a Single Image", Stanford University, Dec. 7, 2016, 12 pages.

Gregor et al., "DRAW: A Recurrent Neural Network for Image Generation", Google DeepMind, May 20, 2015, 10 pages.

Hochreiter et al., "Long Short-Term Memory", Neural Computation: 9(8), Dec. 1997, 33 pages.

Howard et al., "MobileNets: Efficient Convolutional Neural Networks for Mobile Vision Applications", Apr. 17, 2017, 9 pages.

International Search Report and Written Opinion on International Application No. PCT/US2020/070820, dated Mar. 12, 2021, 12 pages.

Kurenkov et al., "DeformNet: Free-Form Deformation Network for 3D Shape Reconstruction from a Single Image", Stanford Vision and Learning Lab, Aug. 11, 2017, 12 pages.

Li et al., "Point Cloud GAN", Carnegie Mellon University, Oct. 13, 2018, 19 pages.

Murtagh, Fionn, "Multilayer perceptrons for classification and regression", Jul. 1991, pp. 183-197.

Qi et al., "PointNet: Deep Hierarchical Feature Learning on Point Sets in a Metric Space", Stanford University, Jun. 7, 2017, 14 pages.

Rankred, "15 Tools to Instantly Convert 2d Images to 3d Ones", Jan. 1, 2020, http://www.rankred.com/convert-2d-images-to-3d, 23 pages.

Russakovsky et al., "ImageNet Large Scale Visual Recognition Challenge" Jan. 30, 2015, 43 pages.

Tatarchenko et al., "Octree Generating Networks: Efficient Convolutional Architectures for High-resolution 3D Outputs", University of Freiburg, Intel Labs, Aug. 7, 2017, 15 pages.

Wang et al., "MVPNet: Multi-View Point Regression Networks for 3D Object Reconstruction from a Single Image", Nov. 23, 2018, 8 pages.

Georgia Gkioxari et al., Mesh R-CNN, Facebook AI Research (FAIR), Jun. 6, 2019, 15 Pages.

* cited by examiner

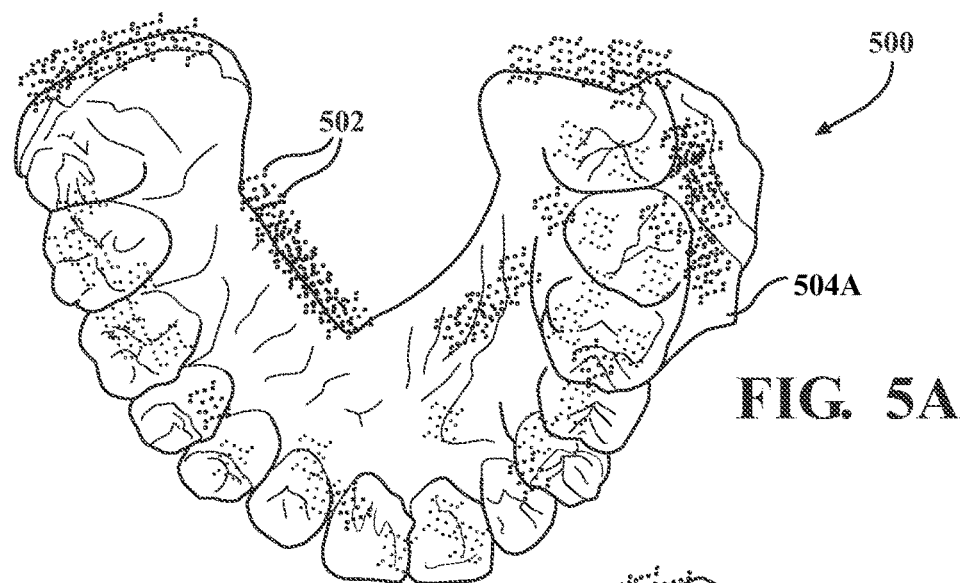
FIG. 5A
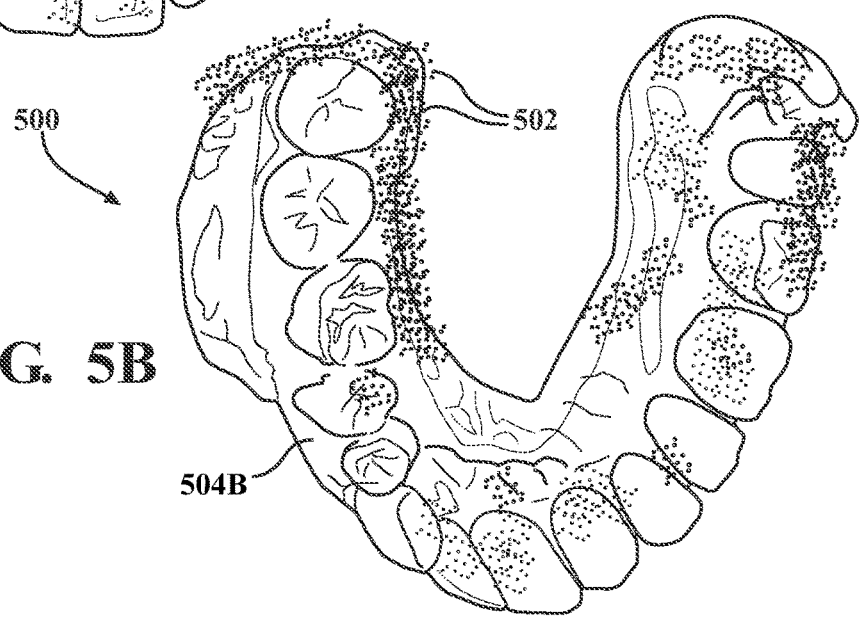
FIG. 5B
FIG. 5C
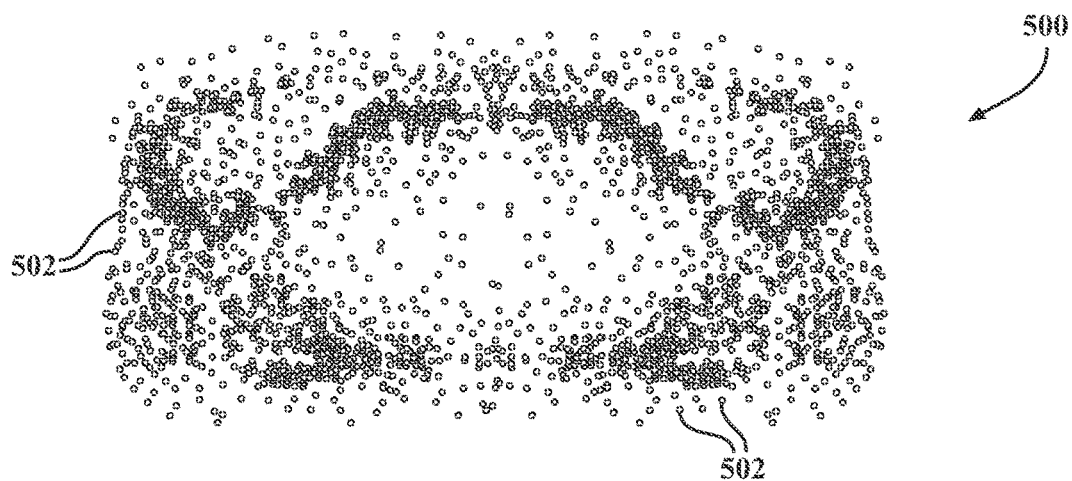

US 11,900,538 B2

SYSTEMS AND METHODS FOR CONSTRUCTING A DENTAL ARCH IMAGE USING A MACHINE LEARNING MODEL

CROSS-REFERENCE TO RELATED APPLICATIONS

This application is a continuation of U.S. patent application Ser. No. 17/090,628 filed Nov. 5, 2020, which is a continuation of U.S. patent application Ser. No. 16/696,468 filed Nov. 26, 2019, each of which are incorporated herein by reference in their entirety.

BACKGROUND

The present disclosure relates generally to constructing three-dimensional models for use in manufacturing dental appliances. More specifically, the present disclosure relates to constructing three-dimensional models of a user's dental arch from two-dimensional images of the user's dental arch to manufacture dental aligners.

Dental aligners for repositioning a user's teeth may be manufactured for the user based on a 3D model of the user's teeth. The 3D model can be generated from a dental impression or an intraoral scan of the user's teeth. Dental impressions for generating such a 3D model can be taken by a user or an orthodontic professional using a dental impression kit. An intraoral scan of the user's mouth can be taken using 3D scanning equipment. However, these methodologies for obtaining information necessary to generate a 3D model of the user's teeth can be time consuming, prone to errors made by the user or orthodontic professional, and require specialized equipment.

SUMMARY

At least one embodiment relates to a method. The method includes receiving, by a model generation system, one or more images of a dental arch of a user. The method includes generating, by the model generation system, a point cloud based on data from the one or more images of the dental arch of the user. The method includes generating, by the model generation system, a three-dimensional (3D) model of the dental arch of the user based on the point cloud. The method includes manufacturing, based on the 3D model of the dental arch of the user, a dental aligner specific to the user and configured to reposition one or more teeth of the user.

Another embodiment relates to a method. The method includes generating, by an image detector from one or more images of a dental arch of a user, an image feature map including a classification of a plurality of portions of the one or more images. Each classification corresponds to a feature within the respective portion of the one or more images. The method includes generating, by a model generation engine, a point cloud using the one or more images. Generating the point cloud includes computing, by an encoder, a probability for of each feature of the image feature map using one or more weights. Generating the point cloud includes generating, by an output engine, a point cloud for the image feature map using the probabilities. Generating the point cloud includes computing, by a decoder, a loss function based on a difference between features from the point cloud and corresponding probabilities of features of the image feature map. Generating the point cloud includes training, by the encoder, the one or more weights for computing the probability based on the computed loss function. The method includes generating, by the model generation engine based on the point cloud, a three-dimensional (3D) model of the dental arch of the user, the 3D model corresponding to the one or more images.

Another embodiment relates to a system. The system includes a processing circuit comprising a processor communicably coupled to a non-transitory computer readable medium. The processor is configured to execute instructions stored on the non-transitory computer readable medium to receive one or more images of a dental arch of a user. The processor is further configured to execute instructions to generate a point cloud based on data from the one or more images of the dental arch of the user. The processor is further configured to execute instructions to generate a three-dimensional (3D) model of the dental arch of the user based on the point cloud. The processor is further configured to execute instructions to transmit the 3D model of the dental arch of the user to a manufacturing system for manufacturing a dental aligner based on the 3D model. The dental aligner is specific to the user and configured to reposition one or more teeth of the user.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 5A is an illustration of an example point cloud overlaid on a digital model of upper dental arch, according to an illustrative embodiment.

FIG. 5B is an illustration of an example point cloud overlaid on a digital model of a lower dental arch, according to an illustrative embodiment.

FIG. 5C is an illustration of a point cloud including the point clouds shown in FIG. 5A and FIG. 5B, according to an illustrative embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, described herein are systems and methods for generating a three-dimensional (3D) model of a user's dental arch from two-dimensional (2D) images. A model generation system receives images of the user's dental arch, generates a point cloud using the images of the user's dental arch, and manufactures dental aligner(s) based on the point cloud. The systems and methods described herein have many advantages over other implementations. For instance, the systems and methods described herein expedite the manufacturing and delivery of dental aligners to a user by more efficiently generating 3D models of the user's dentition without requiring the user to administer a dental impression kit, conduct a scan of their dentition, or attend an appointment with a dentist or orthodontist. By not requiring an appointment with a dentist or orthodontist, such systems and methods may make users more comfortable and confident with receiving orthodontic treatment, and avoid delays in receiving orthodontic treatment due to needing to retake dental impressions or a scan of the user's teeth. If an additional 2D image of the user's dentition is needed, such images can easily be acquired by taking an additional photograph of the user's dentition, whereas a user undergoing a more traditional orthodontic treatment would be required to obtain an impression kit or visit a dentist or orthodontist to have an additional scan of their dentition conducted. Instead of requiring the user to administer dental impressions or visit an intraoral scanning site for receiving an intraoral scan of the user's dentition, the systems and methods described herein leverage images captured by the user to manufacture dental aligners. As another example, the systems and methods described herein may be used to manufacture dental aligners by supplementing data regarding the user's dentition, for example, acquired by an intraoral scan, or a dental impression administered by the user.

Figure 1:
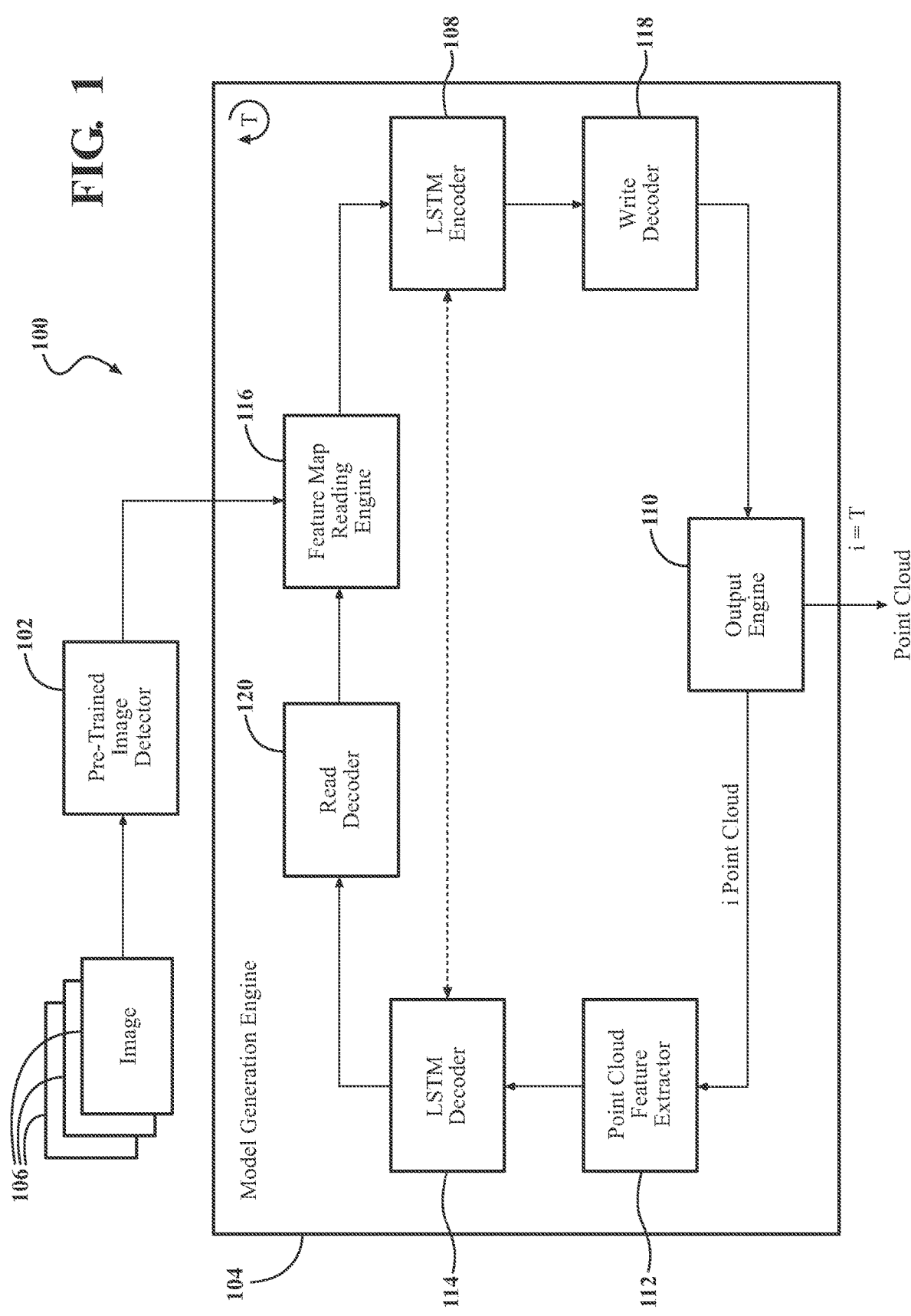
FIG. 1 is a block diagram of a system for generating a three-dimensional (3D) model from one or more two-dimensional (2D) images, according to an illustrative embodiment.

Referring now to FIG. 1, a system 100 for generating a three dimensional (3D) model is shown according to an illustrative embodiment. The system 100 (also referred to herein as a model generation system 100) is shown to include a pre-trained image detector 102 and a model generation engine 104. As described in greater detail below, the pre-trained image detector 102 is configured to generate an image feature map from one or more images 106 of a mouth of a user. The model generation engine 104 is configured to generate a 3D model using the one or more images 106. The model generation engine 104 includes a long short-term memory (LSTM) encoder 108 configured to compute a probability of each feature of the image feature map using one or more weights. The model generation engine 104 includes an output engine 110 configured to generate a point cloud using data from the LSTM encoder 108. The model generation engine 104 includes a point cloud feature extractor 112 configured to determine features from the point cloud generated by the output engine 110. The model generation engine 104 includes an LSTM decoder 114 configured to determine a difference between features from the point cloud and corresponding probabilities of features of the image feature map. The LSTM encoder 108 trains the one or more weights for computing the probability based on the difference determined by the LSTM decoder 114. The model generation engine 104 iteratively cycles between the LSTM encoder 108, output engine 110, point cloud feature extractor 112, and LSTM decoder 114 to generate and refine point clouds corresponding to the images 106. At the final iteration, an output engine 110 is configured to generate the 3D model using the final iteration of the point cloud.

The model generation system 100 is shown to include a pre-trained image detector 102. The pre-trained image detector 102 may be any device(s), component(s), application(s), element(s), script(s), circuit(s), or other combination of software and/or hardware designed or implemented to generate an image feature map from one or more images 106. The pre-trained image detector 102 may be embodied on a server or computing device, embodied on a mobile device communicably coupled to a server, and so forth. In some implementations, the pre-trained image detector 102 may be embodied on a server which is designed or implemented to generate a 3D model using two dimensional (2D) images. The server may be communicably coupled to a mobile device (e.g., via various network connections).

Figure 2A:
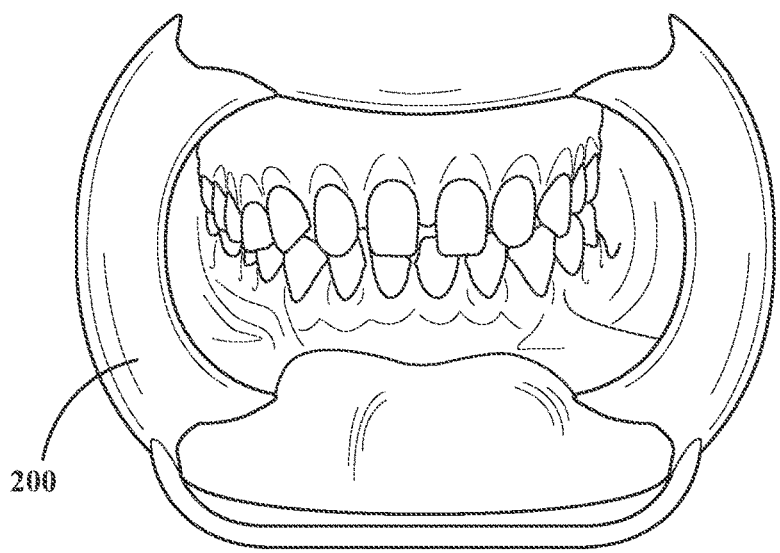
FIG. 2A is an illustration of a first example image of a patient's mouth, according to an illustrative embodiment.
Figure 2B:
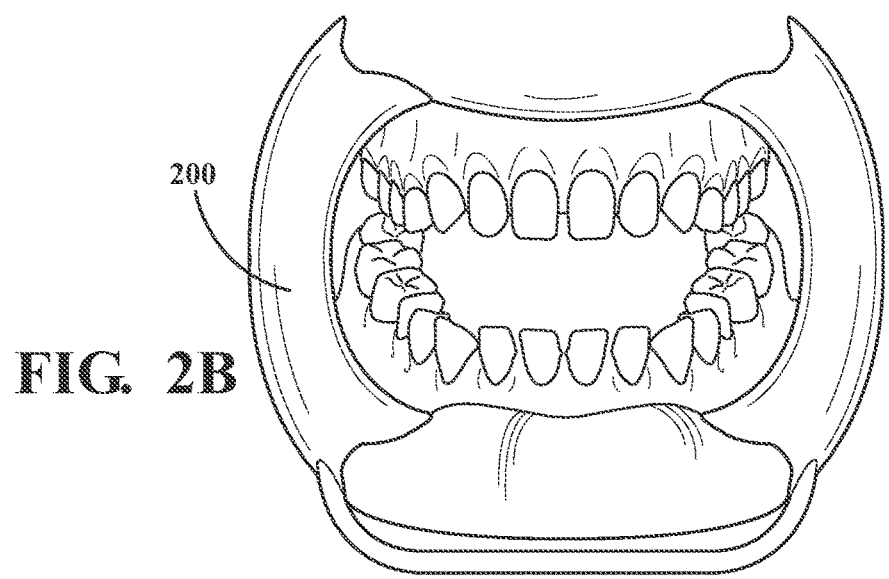
FIG. 2B is an illustration of a second example image of a patient's mouth, according to an illustrative embodiment.
Figure 2C:
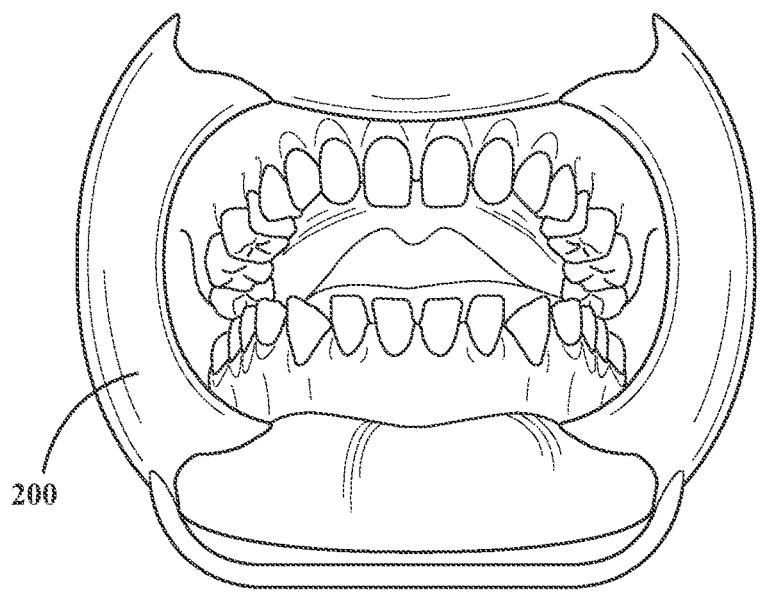
FIG. 2C is an illustration of a third example image of a patient's mouth, according to an illustrative embodiment.

Referring now to FIG. 1 and FIG. 2A-FIG. 2C, the pre-trained image detector 102 may be configured to receive one or more images 106 of a mouth of a user, such as one or more 2D images. Specifically, FIG. 2A-FIG. 2C are illustrations of example images 106 of a user's mouth. The user may capture a first image 106 of a straight on, closed view of the user's mouth by aiming a camera in a straight-on manner perpendicular to the labial surface of the teeth (shown in FIG. 2A), a second image 106 of a lower, open view of the user's mouth by aiming a camera from an upper angle down toward the lower teeth (shown in FIG. 2B), and a third image 106 of an upper, open view of the user's mouth by aiming a camera from a lower angle up toward the upper teeth (shown in FIG. 2C). The user may capture images 106 with a dental appliance 200 positioned at least partially within the user's mouth. The dental appliance 200 is configured to hold open the user's lips to expose the user's teeth and gingiva. The user may capture various image(s) 106 of the user's mouth (e.g., with the dental appliance 200 positioned therein). In some embodiments, the user takes two images of their teeth from substantially the same viewpoint (e.g., both from a straight-on viewpoint), or from substantially the same viewpoint but offset slightly. After capturing the images 106, the user may upload the images 106 to the pre-trained image detector 102 (e.g., to a website or internet-based portal associated with the pre-trained image detector 102 or model generation system 100, by emailing or sending a message of the images 106 to an email address or phone number or other account associated with the pre-trained image detector 102, and so forth).

The pre-trained image detector 102 is configured to receive the images 106 from the mobile device of the user. The pre-trained image detector 102 may receive the images 106 directly from the mobile device (e.g., by the mobile device transmitting the images 106 via a network connection to a server which hosts the pre-trained image detector 102). The pre-trained image detector 102 may retrieve the images 106 from a storage device (e.g., where the mobile device stored the images 106 on the storage device, such as a database or a cloud storage system). In some embodiments, the pre-trained image detector 102 is configured to score the images 106. The pre-trained image detector 102 may generate a metric which identifies the overall quality of the image. The pre-trained image detector 102 may include a Blind/Referenceless Image Spatial Quality Evaluator (BRISQUE). The BRISQUE is configured to generate an image score between a range (e.g., between 0-100, for instance, with lower scores being generated for images having higher quality). The BRISQUE may be configured to generate the image score based on, for example, the measured pixel noise, image distortion, and so forth, to objectively evaluate the image quality. Where the image score does not satisfy a threshold, the pre-trained image detector 102 may be configured to generate a prompt for the user which directs the user to re-take one or more of the images 106.

Figure 3:
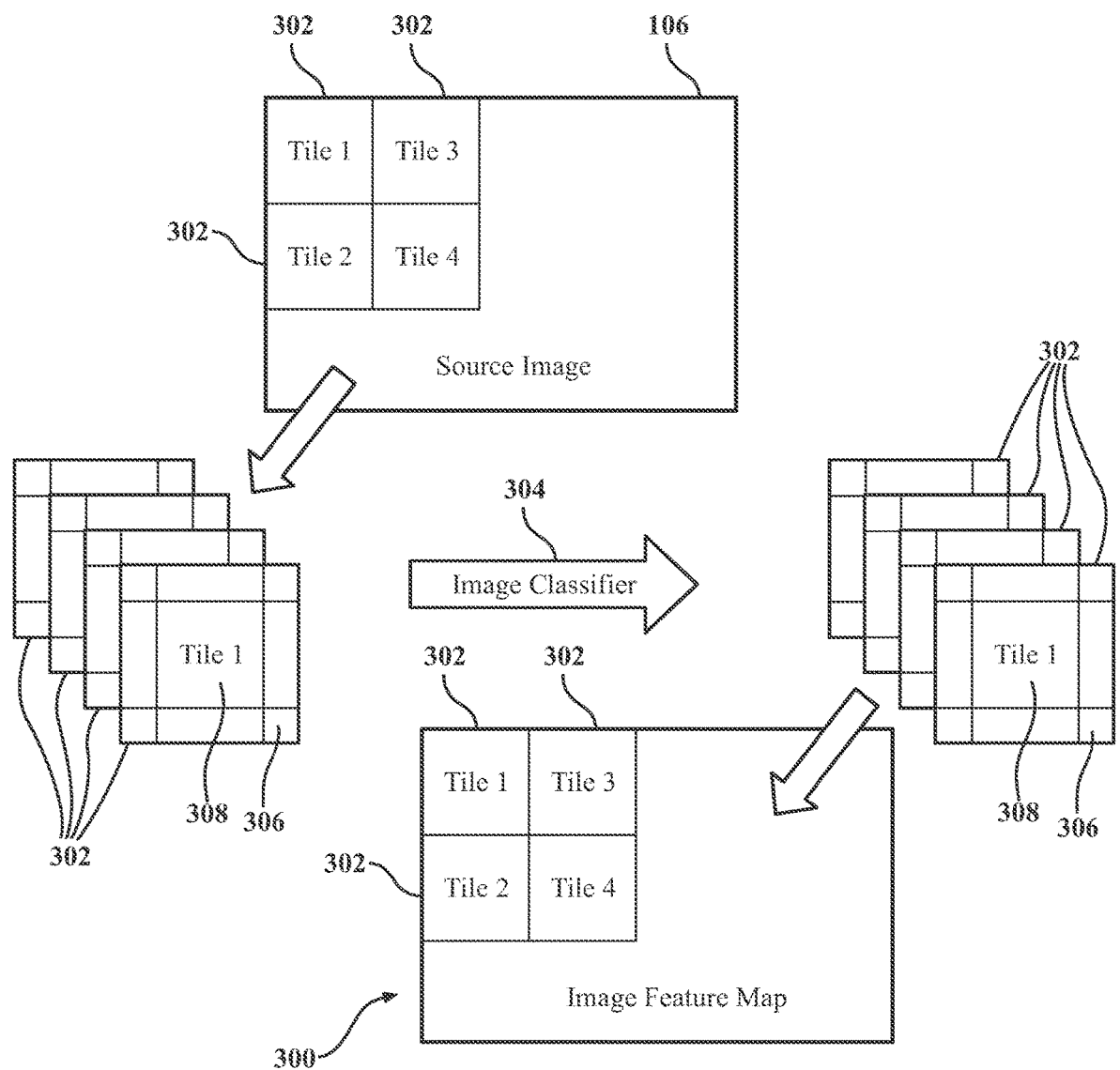
FIG. 3 is a block diagram of an image feature map generated by the system of FIG. 1, according to an illustrative embodiment.

Referring now to FIG. 1 and FIG. 3, the pre-trained image detector 102 is configured to process the image(s) 106 to generate an image feature map 300. Specifically, FIG. 3 is a block diagram of an image feature map 300 corresponding to one of the image(s) 106 received by the pre-trained image detector 102. The pre-trained image detector 102 may be configured to process images 106 received from the mobile device of the user to generate the image feature map 300. In some implementations, the pre-trained image detector 102 is configured to break down, parse, or otherwise segment the images 106 into a plurality of portions. In some implementations, the pre-trained image detector 102 is configured to segment the images 106 into a plurality of tiles 302. Each tile 302 corresponds to a particular portion, section, or region of a respective image 106. In some instances, the tiles 302 may have a predetermined size or resolution. For instance, the tiles 302 may have a resolution of 512 pixels×512 pixels (though the tiles 302 may have different sizes or resolutions). The tiles 302 may each be the same size, or some tiles 302 may have a different size than other tiles 302. In some embodiments, the tiles 302 may include a main portion 306 (e.g., located at or towards the middle of the tile 302) and an overlapping portion 308 (e.g., located along the perimeter of the tile 302). The main portion 306 of each tile 302 may be unique to each respective tile 302. The overlapping portion 308 may be a common portion shared with one or more neighboring tiles 302. The overlapping portion 308 may be used by the pre-trained image detector 102 for context in extracting features (e.g., tooth size, tooth shape, tooth location, tooth orientation, crown size, crown shape, gingiva location, gingiva shape or contours, tooth-to-gingiva interface location, interproximal region location, and so forth) from the main portion of the tile 302.

The pre-trained image detector 102 is configured to determine, identify, or otherwise extract one or more features from the tiles 302. In some implementations, the pre-trained image detector 102 includes an image classifier neural network 304 (also referred to herein as an image classifier 304). The image classifier 304 may be implemented using a neural network similar to the neural network 400 shown in FIG. 4 and subsequently described. For instance, the image classifier 304 may include an input layer (e.g., configured to receive the tiles 302), one or more hidden layers including various pre-trained weights (e.g., corresponding to probabilities of particular classifications for tiles 302), and an output layer. Each of these layers are described below. The image classifier neural network 304 of the pre-trained image detector 102 is configured to classify each of the tiles 302. The pre-trained image detector 102 may be implemented using various architectures, libraries, or other combination of software and hardware, such as the Mobile-Net architecture, though other architectures may be used (e.g., based on balances between memory requirements, processing speeds, and performance). The pre-trained image detector 102 is configured to process each of the tiles 302 (e.g., piecewise) and stitch together the tiles 302 to generate the image feature map 300. Each classification for a respective tile 302 may correspond to an associated feature within the tile 302. Various examples of classifications include, for instance, a classification of a tooth (e.g., incisors or centrals, canines, premolars or bicuspids, molars, etc.) included in a tile 302, a portion of the tooth included in the tile 302 (e.g., crown, root), whether the gingiva is included in the tile 302, etc. Such classifications may each include corresponding features which are likely to be present in the tile. For instance, if a tile 302 includes a portion of a tooth and a portion of the gingiva, the tile 302 likely includes a tooth-to-gingiva interface. As another example, if a tile 302 includes a molar which shows the crown, the tile 302 likely includes a crown shape, crown size, etc.

In some implementations, the pre-trained image detector 102 is configured to classify each of the tiles 302. For instance, the output from the image classifier 304 may be a classification (or probability of a classification) of the corresponding tile 302 (e.g., provided as an input to the image classifier 304). In such implementations, the image feature map 300 may include each of the tiles 302 with their corresponding classifications. The pre-trained image detector 102 is configured to construct the image feature map 300 by stitching together each of the tiles 302 with each tile 302 including their respective classification. In this regard, the pre-trained image detector 102 is configured to re-construct the images 106 by stitching together the tiles 302 to form the image feature map 300, with the image feature map 300 including the tiles 302 and corresponding classifications. The pre-trained image detector 102 is configured to provide the image feature map 300 as an input to a model generation engine 104. In some implementations, the image feature map 300 generated by the pre-trained image detector 102 may be a compressed filed (e.g., zipped or other format). The pre-trained image detector 102 may be configured to format the image feature map 300 into a compressed file for transmission to the model generation engine 104. The model generation engine 104 may be configured to parse the image feature map 300 for generating a point cloud corresponding to the image(s) 106, as described in greater detail below.

The model generation system 100 is shown to include a model generation engine 104. The model generation engine 104 may be any device(s), component(s), application(s), element(s), script(s), circuit(s), or other combination of software and/or hardware designed or implemented to generate a three-dimensional (3D) model of a user's dental arch from one or more images 106 of the user's dentition. The model generation engine 104 is configured to generate the 3D model using a plurality of images 106 received by the pre-trained image detector 102 (e.g., from a mobile device of the user). The model generation engine 104 may include a processing circuit including one or more processors and memory. The memory may store various instructions, routines, or other programs that, when executed by the processor(s), cause the processor(s) to perform various tasks relating to the generation of a 3D model. In some implementations, various subsets of processor(s), memory, instructions, routines, libraries, etc., may form an engine. Each engine may be dedicated to performing particular tasks associated with the generation of a 3D model. Some engines may be combined with other engines. Additionally, some engines may be segmented into a plurality of engines.

The model generation engine 104 is shown to include a feature map reading engine 116. The feature map reading engine 116 may be any device(s), component(s), application(s), element(s), script(s), circuit(s), or other combination of software and/or hardware designed or implemented to read features from an image feature map 300. The feature map reading engine 116 may be designed or implemented to format, re-format, or modify the image feature map 300 received from the pre-trained image detector 102 for use by other components of the model generation engine

104. For instance, where the output from the pre-trained image detector 102 is a compressed file of the image feature map 300, the feature map reading engine 116 is configured to decompress the file such that the image feature map 300 may be used by other components or elements of the model generation engine 104. In this regard, the feature map reading engine 116 is configured to parse the output received from the pre-trained image detector 102. The feature map reading engine 116 may parse the output to identify the tiles 302, the classifications of the tiles 302, features corresponding to the classifications of the tiles 302, etc. The feature map reading engine 116 is configured to provide the image feature map 300 as an input to an LSTM encoder 108, as described in greater detail below.

Figure 4:
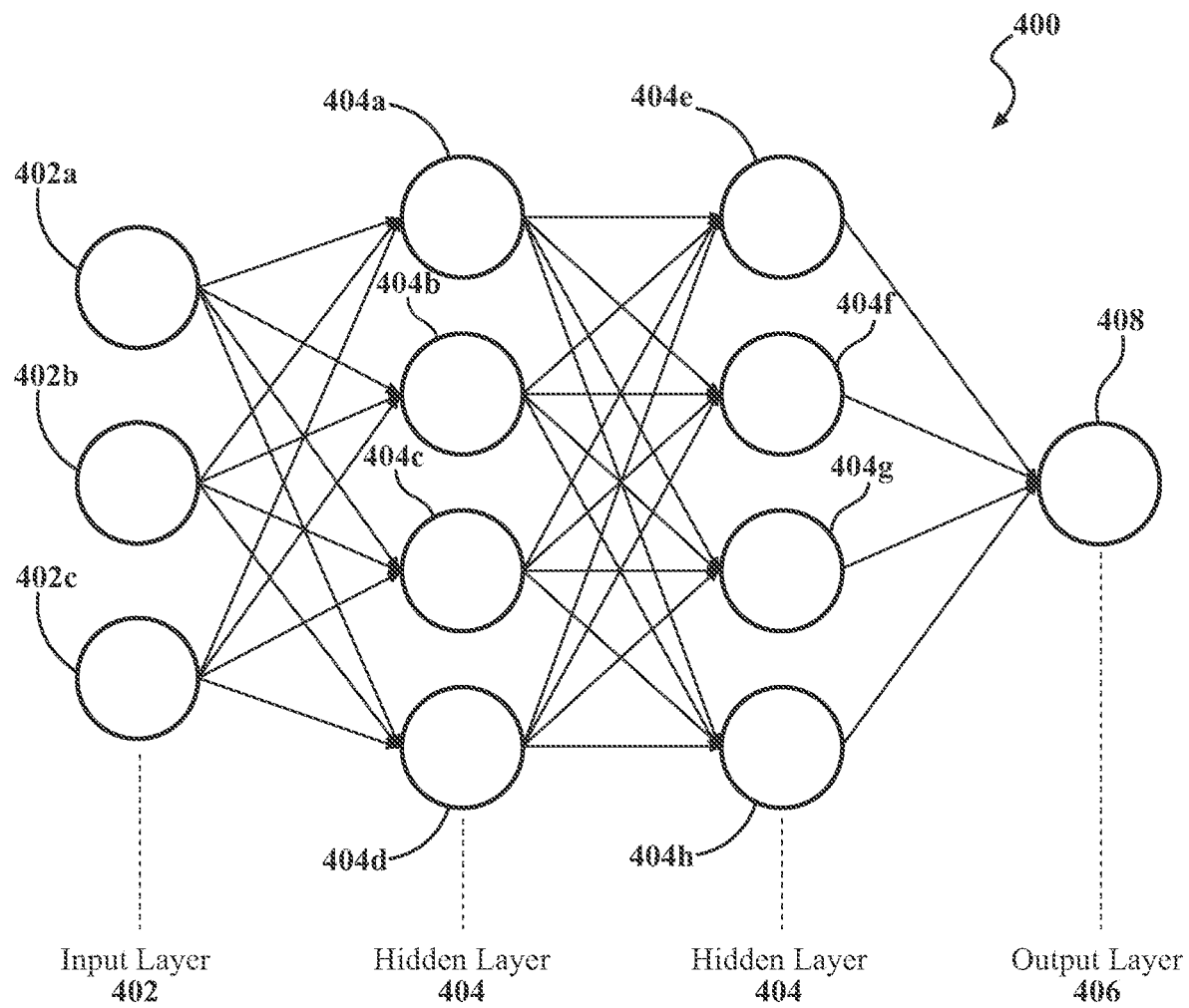
FIG. 4 is a block diagram of a neural network which may be implemented within one or more of the components of FIG. 1, according to an illustrative embodiment.

Referring now to FIG. 1 and FIG. 4, the model generation engine 104 is shown to include an LSTM encoder 108 and LSTM decoder 114. Specifically, FIG. 4 is a block diagram of an implementation of a neural network 400 which may implement various components, features, or aspects within the LSTM encoder 108 and/or LSTM decoder 114. The LSTM encoder 108 may be any device(s), component(s), application(s), element(s), script(s), circuit(s), or other combination of software and/or hardware designed or implemented to compute a probability for each feature of the image feature map 300 using one or more weights. The LSTM decoder 114 may be any device(s), component(s), application(s), element(s), script(s), circuit(s), or other combination of software and/or hardware designed or implemented to determine a difference between features from a point cloud and corresponding probabilities of features of the image feature map 300 (e.g., computed by the LSTM encoder 108). The LSTM encoder 108 and LSTM decoder 114 may be communicably coupled to one another such that the outputs of one may be used as an input of the other. The LSTM encoder 108 and LSTM decoder 114 may function cooperatively to refine point clouds corresponding to the images 106, as described in greater detail below.

As shown in FIG. 4, the neural network 400 includes an input layer 402 including a plurality of input nodes 402a-402c, a plurality of hidden layers 404 including a plurality of perception nodes 404a-404h, and an output layer 406 including an output node 408. The input layer 402 is configured to receive one or more inputs via the input nodes 402a-402c (e.g., the image feature map 300, data from the LSTM decoder 114, etc.). The hidden layer(s) 404 are connected to each of the input nodes 402a-402c of the input layer 402. Each layer of the hidden layer(s) 404 are configured to perform one or more computations based on data received from other nodes. For instance, a first perception node 404a is configured to receive, as an input, data from each of the input nodes 402a-402c, and compute an output by multiplying or otherwise providing weights to the input. As described in greater detail below, the weights may be adjusted at various times to tune the output (e.g., probabilities of certain features being included in the tiles 302). The computed output is then provided to the next hidden layer 404 (e.g., to perception nodes 404e-404h), which then compute a new output based on the output from perception node 404a as well as outputs from perception nodes 404b-404d. In the neural network implemented in the LSTM encoder 108, for instance, the hidden layers 404 may be configured to compute probabilities of certain features in the images 106 of the user's dentition based on the image feature map 300 and data from the LSTM decoder 114, as described in greater detail below. For instance, the hidden layers 404 may be configured to compute probabilities of features, such as tooth size, tooth shape, tooth location, tooth orientation, crown size, crown shape, gingiva location, gingiva shape or contours, tooth-to-gingiva interface location, interproximal region location, and so forth. Together, such features describe, characterize, or otherwise define the user's dentition.

The LSTM encoder 108 is configured to compute a probability of each potential feature being present in the images 106. The LSTM encoder 108 is configured to receive the image feature map 300 (e.g., from the pre-trained image detector 102 directly, or indirectly from the feature map reading engine 116). The LSTM encoder 108 may be or include a neural network (e.g., similar to the neural network 400 depicted in FIG. 4) designed or implemented to compute a probability of the potential features in the images 106 using the image feature map 300. The LSTM encoder 108 may be configured to use data from the LSTM decoder 114 and the image feature map 300 for computing a probability of the features within the images 106. Each feature associated with an image (e.g., of a user's dentition) or a tile 302 for an image 106 may have a corresponding probability. The probability may be a probability or likelihood of a particular feature being present within the image 106 or tile 302 (e.g., a probability of a particular tooth size, tooth orientation, tooth-to-gingiva interface location, etc. within the image 106 or tile 302). For instance, neurons of the neural network may be trained to detect and compute a probability for various potential features described above within an image 106. The neurons may be trained using a training set of images and/or tiles and labels corresponding to particular features, using feedback from a user (e.g., validating outputs from the neural network), etc.

As an example, a lateral incisor may have several possible orientations. A neuron of the LSTM encoder 108 may be trained to compute probabilities of the orientation of the lateral incisor relative to a gingival line. The neuron may detect (e.g., based on features from the image feature map 300) the lateral incisor having an orientation extending 45° from the gingival line along the labial side of the dental arch. The LSTM encoder 108 is configured to compute a probability of the lateral incisor having the orientation extending 45° from the gingival line. As described in greater detail below, during subsequent iterations, the neuron may have weights which are further trained to detect the lateral incisor having an orientation extending 60° from the gingival line along the labial side of the dental arch and compute the probability of the lateral incisor having the orientation extending 60° from the gingival line. Through a plurality of iterations, the probabilities of the orientation of the lateral incisor are adjusted, modified, or otherwise trained based on determined orientations and feedback from the LSTM decoder 114. In this regard, the neurons of the LSTM encoder 108 have weights which are tuned, adjusted, modified, or otherwise trained over time to have both a long term memory (e.g., through training of the 45° orientation in the example above) and short term memory (e.g., through training of the 60° orientation in the example above).

As such, the neurons are trained to detect that a tooth may have multiple possible features (e.g., a tooth may have an orientation of 45° or 60°, or other orientations detected through other iterations). Such implementations and embodiments provide for a more accurate overall 3D model which more closely matches the dentition of the user by providing an LSTM system which is optimized to remember information from previous iterations and incorporate that information as feedback for training the weights of the hidden layer 404 of the neural network, which in turn generates the output (e.g., via the output layer 406), which is used by the output engine 110 for generating the output (e.g., the 3D model). In some implementations, the LSTM encoder 108 and LSTM decoder 114 may be trained with training sets (e.g., sample images). In other implementations, the LSTM encoder 108 and LSTM decoder 114 may be trained with images received from users (e.g., similar to images 106). In either implementation, the LSTM encoder 108 and LSTM decoder 114 may be trained to detect a large set of potential features within images of a user's dental arches (e.g., various orientation, size, etc. of teeth within a user's dentition). Such implementations may provide for a robust LSTM system by which the LSTM encoder 108 can compute probabilities of a given image containing certain features.

Referring back to FIG. 1, the LSTM encoder 108 is configured to generate an output of a plurality of probabilities of each feature based on the input (e.g., the image feature map 300 and inputs from the LSTM decoder 114 described in greater detail below) and weights from the neural network of the LSTM encoder 108. The output layer 406 of the neural network corresponding to the LSTM encoder 108 is configured to output at least some of the probabilities computed by the hidden layer(s) 404. The output layer 406 may be configured to output each of the probabilities, a subset of the probabilities (e.g., the highest probabilities, for instance), etc. The output layer 406 is configured to transmit, send, or otherwise provide the probabilities to a write decoder 118.

The write decoder 118 may be any device(s), component(s), application(s), element(s), script(s), circuit(s), or other combination of software and/or hardware designed or implemented to maintain a list of each of the computed probabilities by the LSTM encoder 108. The write decoder 118 is configured to receive the output from the LSTM encoder 108 (e.g., from the output layer 406 of the neural network corresponding to the LSTM encoder 108). In some implementations, the write decoder 118 maintains the probabilities in a ledger, database, or other data structure (e.g., within or external to the system 100). As probabilities are recomputed by the LSTM encoder 108 during subsequent iterations using updated weights, the write decoder 118 may update the data structure to maintain a list or ledger of the computed probabilities of each feature within the images 106 for each iteration of the process.

The output engine 110 may be any device(s), component(s), application(s), element(s), script(s), circuit(s), or other combination of software and/or hardware designed or implemented to generate a point cloud 500. FIG. 5A-FIG. 5C are illustrations of an example point cloud 500 overlaid on an upper dental arch 504A and a lower dental arch 504B, and a perspective view of the point cloud 500 for the upper and lower dental arch aligned to one another, respectively. The point clouds 500 shown in FIG. 5A-FIG. 5C are generated by the output engine 110. The output engine 110 may be configured to generate the point cloud 500 using the image(s) 106 received by the pre-trained image detector 102. As described in greater detail below, the output engine 110 may be configured to generate a point cloud 500 of a dental arch of the user using probabilities of features within one or more of the images 106. In some instances, the output engine 110 may be configured to generate a point cloud 500 of a dental arch using probabilities of features within one of the images 106. For instance, the output engine 110 may be configured to generate a point cloud 500 of an upper dental arch 504A using an image of an upper open view of the upper dental arch of the user (e.g., such as the image shown in FIG. 2C). In some instances, the output engine 110 may be configured to generate a point cloud 500 of the upper dental arch 504A using two or more images (e.g., the images shown in FIG. 2B and FIG. 2C, the images shown in FIG. 2A-FIG. 2C, or further images). In some instances, the output engine 110 may be configured to generate a point cloud 500 of the lower dental arch 504B using one image (e.g., the image shown in FIG. 2A), a plurality of images (e.g., the images shown in FIG. 2A-FIG. 2B, FIG. 2A-FIG. 2C), etc. The output engine 110 may be configured to combine the point clouds 500 generated for the upper and lower dental arch 504A, 504B to generate a point cloud 500, as shown in FIG. 5C, which corresponds to the mouth of the user. The output engine 110 may use each of the images 106 for aligning the point cloud of the upper and lower dental arch 504A, 504B.

The output engine 110 is configured to generate the point cloud 500 based on data from the LSTM encoder 108 via the write decoder 118. The output engine 110 is configured to parse the probabilities generated by the LSTM encoder 108 to generate points 502 for a point cloud 500 which correspond to features within the images 106. Using the previous example, the LSTM encoder 108 may determine that the highest probability of an orientation of a lateral incisor is 45° from the gingival line along the labial side. The output engine 110 may generate points 502 for the point cloud 500 corresponding to a lateral incisor having an orientation of 45° from the gingival line along the labial side. The output engine 110 is configured to generate points 502 in a 3D space corresponding to features having a highest probability as determined by LSTM encoder 108, where the points 502 are located along an exterior surface of the user's dentition. In some instances, the output engine 110 may generate the points 502 at various locations within a 3D space which align with the highest probability features of the image(s) 106. Each point 502 may be located in 3D space at a location which maps to locations of features in the images. As such, the output engine 110 may be configured to generate points 502 for the point cloud 500 which match the probability of features in the images 106 (e.g., such that the points 502 of the point cloud 500 substantially match a contour of the user's dentition as determined based on the probabilities). The output engine 110 is configured to provide the point cloud 500 to the point cloud feature extractor 112.

The point cloud feature extractor 112 may be any device(s), component(s), application(s), element(s), script(s), circuit(s), or other combination of software and/or hardware designed or implemented to determine one or more features within a point cloud 500. The point cloud feature extractor 112 may be configured to compute, extract, or otherwise determine one or more features from the point cloud 500 to generate an image feature map (e.g., similar to the image feature map received by the LSTM encoder 108). The point cloud feature extractor 112 may leverage one or more external architectures, libraries, or other software for generating the image feature map from the point cloud 500. In some implementations, the point cloud feature extractor 112 may leverage the PointNet architecture to extract feature vectors from the point cloud 500. In this regard, the images 106 are used (e.g., by the pre-trained image detector 102) for generating an image feature map 300, which is used (e.g., by the LSTM encoder 108 and output engine 110) to generate a point cloud 500, which is in turn used (e.g., by the point cloud feature extractor 112) to extract features. The point cloud feature extractor 112 is configured to transmit, send, or otherwise provide the extracted features from the point cloud 500 to the LSTM decoder 114.

The LSTM decoder 114 is configured to receive (e.g., as an input) the extracted features from the point cloud feature extractor 112 and the probabilities of features computed by the LSTM encoder 108. The LSTM decoder 114 is configured to compute, based on the extracted features and the probabilities, a difference between the output from the LSTM encoder 108 and the point cloud 500. In some implementations, the LSTM decoder 114 is configured to compute a loss function using the extracted features from the point cloud 500 and the corresponding probabilities of each feature from the image feature map 300. The LSTM decoder 114 may be configured to determine which features extracted from the point cloud 500 correspond to features within the image feature map 300. The LSTM decoder 114 may determine which features correspond to one another by comparing each feature (e.g., extracted from the point cloud 500 and identified in the image feature map 300) to determine which features most closely match one another. The LSTM decoder 114 may determine which features correspond to one another based on coordinates for points of the point cloud 500 and associated location of tiles 302 in the image feature map 300 (e.g., the coordinates residing within one of the tiles 302, particular regions of the 3D space in which the points correspond to specific tiles 302, and so forth).

Once two features are determined (e.g., by the LSTM decoder 114) to correspond to one another, the LSTM decoder 114 compares the corresponding features to determine differences. For instance, where the feature is determined to be an orientation of a specific tooth, the LSTM decoder 114 is configured to compare the orientation of the feature from the image(s) 106 and the orientation from the point cloud 500. The LSTM decoder 114 is configured to compare the orientations to determine whether the feature represented in the point cloud 500 matches the feature identified in the image(s) 106 (e.g., the same orientation). In some implementations, the LSTM decoder 114 is configured to determine the differences by computing a loss function (e.g., using points 502 from the point cloud 500 and corresponding features from the image feature map 300). The loss function may be a computation of a distance between two points (e.g., a point 502 of the point cloud 500 and corresponding features from the image feature map 300). As the value of the loss function increases, the point cloud 500 correspondingly is less accurate (e.g., because the points 502 of the point cloud 500 do not match the features of the image feature map 300). Correspondingly, as the value of the loss function decreases, the point cloud 500 is more accurate (e.g., because the points 502 of the point cloud 500 more closely match the features of the image feature map 300). The LSTM decoder 114 may provide the computed loss function, the differences between the features, etc. to the LSTM encoder 108 (e.g., either directly or through the read decoder 120) so that the LSTM encoder 108 adjusts, tunes, or otherwise modifies weights for computing the probabilities based on feedback from the LSTM decoder 114. In implementations in which the LSTM decoder 114 is configured to provide data to the LSTM encoder 108 through the read decoder 120, the read decoder 120 (e.g., similar to the write decoder 118) is configured to process the data from the LSTM decoder 114 to record the differences for adjustment of the weights for the LSTM encoder 108.

During subsequent iterations, the LSTM encoder 108 is configured to modify, refine, tune, or otherwise adjust the weights for the neural network 400 based on the feedback from the LSTM decoder 114. The LSTM encoder 108 may then compute new probabilities for features in the images 106, which is then used by the output engine 110 for generating points for a point cloud 500. As such, the LSTM decoder 114 and LSTM encoder 108 cooperatively adjust the weights for forming the point clouds 500 to more closely match the point cloud 500 to the features identified in the images 106. In some implementations, the LSTM encoder 108 and LSTM decoder 114 may perform a number of iterations. The number of iterations may be a predetermined number of iterations (e.g., two iterations, five iterations, 10 iterations, 50 iterations, 100 iterations, 200 iterations, 500 iterations, 1,000 iterations, 2,000 iterations, 5,000 iterations, 8,000 iterations, 10,000 iterations, 100,000 iterations, etc.). In some implementations, the number of iterations may change between models generated by the model generation system 100 (e.g., based on a user selection, based on feedback, based on a minimization or loss function or other algorithm, etc.). For instance, where the LSTM decoder 114 computes a loss function based on the difference between the features from the point cloud 500 and probabilities computed by the LSTM encoder 108, the number of iterations may be a variable number depending on the time for the loss function to satisfy a threshold. Hence, the LSTM encoder 108 may iteratively adjust weights based on feedback from the LSTM decoder 114 until the computed values for the loss function satisfy a threshold (e.g., an average of 0.05 mm, 0.1 mm, 0.15 mm, 0.2 mm, 0.25 mm, etc.). Following the final iteration, the output engine 110 is configured to provide the final iteration of the point cloud 500.

In some implementations, the output engine 110 is configured to merge the point cloud 500 with another point cloud or digital model of the user's dentition. For instance, the output engine 110 may be configured to generate a merged model from a first digital model (e.g., the point cloud 500) and a second digital model (e.g., a scan of a user's dentition, a scan of a dental impression of the user's dentition, etc.). In some implementations, the output engine 110 is configured to merge the point cloud 500 with another 3D model using at least some aspects as described in U.S. patent application Ser. No. 16/548,712, filed Aug. 22, 2019, the contents of which are incorporated herein by reference in its entirety.

The point cloud 500 may be used to manufacture a dental aligner specific to the user and configured to reposition one or more teeth of the user. The output engine 110 may be configured to provide the point cloud 500 to one or more external systems for generating the dental aligner. For instance, the output engine 110 may transmit the point cloud 500 to a 3D printer to print a positive mold using the point cloud. A material may be thermoformed to the positive mold to form a shape of a dental aligner, and the dental aligner may be cut from the positive model. As another example, the output engine 110 may transmit the point cloud 500 to a 3D printer to directly print a dental aligner.

Figure 6:
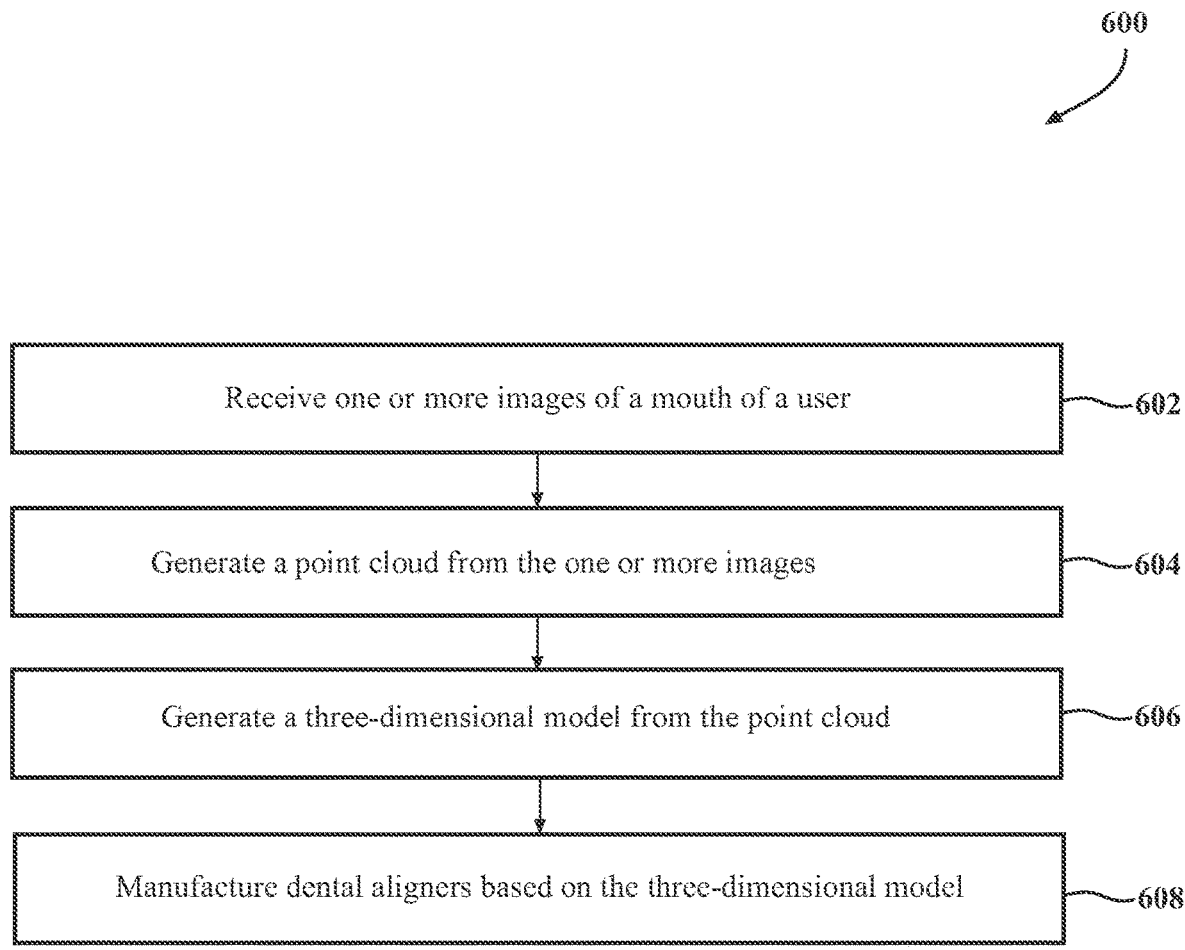
FIG. 6 is a diagram of a method of generating a 3D model from one or more 2D images, according to an illustrative embodiment.

Referring now to FIG. 6, a diagram of a method 600 of generating a three-dimensional model from one or more two-dimensional images is shown according to an illustrative embodiment. The method 600 may be implemented by one or more of the components described above with reference to FIG. 1-FIG. 5. As an overview, at step 602, a model generation system 100 receives one or more images 106 of a mouth of a user. At step 604, the model generation system 100 generates a point cloud 500 from the one or more images 106. At step 606, the model generation system generates a three-dimensional (3D) model from the point cloud 500. At step 608, dental aligners are manufactured based on the 3D model.

At step 602, a model generation system 100 receives one or more images 106 of a mouth of a user. The images 106 may be captured by the user. The user may capture the images 106 of the user's mouth with a dental appliance 200 positioned at least partially therein. In some implementations, the user is instructed how to capture the images 106. The user may be instructed to take at least three images 106. The images 106 may be similar to those shown in FIG. 2A-FIG. 2C. The user may capture the image(s) 106 on their mobile device or any other device having a camera. The user may upload, transmit, send, or otherwise provide the image(s) 106 to the model generation system 100 (e.g., to an email or account associated with the model generation system 100, via an internet-based portal, via a website, etc.). The model generation system 100 receives the image(s) 106 (e.g., from the mobile device of the user). The model generation system 100 uses the image(s) 106 for generating a 3D model of the user's mouth, as described in greater detail below.

At step 604, the model generation system 100 generates a point cloud 500 from the one or more images. In some embodiments, the model generation system 100 generates the point cloud 500 based on data from the one or more images 106 of the dental arch of the user (e.g., received at step 602). The model generation system 100 may parse the images 106 to generate image feature maps 300. The model generation system 100 may compute probabilities of features of the image feature map 300. The model generation system 100 may generate a point cloud 500 using the probabilities of the features of the image feature map 300. The model generation system 100 may determine features of the point cloud 500. The model generation system 100 may determine differences between the features of the point cloud and corresponding probabilities of the features of the image feature map. The model generation system 100 may train weights for computing the probabilities. The model generation system 100 may iteratively refine the point cloud 500 until a predetermined condition is met. Various aspects in which the model generation system 100 generates the point cloud 500 are described in greater detail below with reference to FIG. 7.

At step 606, the model generation system 100 generates a three-dimensional (3D) model. The model generation system 100 generates a 3D model of the mouth of the user (e.g., a 3D model of the upper and lower dental arch of the user). In some embodiments, the model generation system 100 generates a first 3D model of an upper dental arch of the user, and a second 3D model of a lower dental arch of the user. The model generation system 100 may generate the 3D models using the generated point cloud 500 (e.g., at step 604). In some embodiments, the model generation system 100 generates the 3D model by converting a point cloud 500 for the upper dental arch and a point cloud 500 for the lower dental arch into a stereolithography (STL) file, with the STL file being the 3D model. In some embodiments, the model generation system 100 uses the 3D model for generating a merged model. The model generation system 100 may merge the 3D model generated based on the point cloud 500 (e.g., at step 606) with another 3D model (e.g., with a 3D model generated by scanning the user's dentition, with a 3D model generated by scanning an impression of the user's dentition, with a 3D model generated by scanning a physical model of the user's dentition which is fabricated based on an impression of the user's dentition, etc.) to generate a merged (or composite) model.

At step 608, dental aligner(s) are manufactured based on the 3D model. In some embodiments, a manufacturing system manufactures the dental aligner(s) based at least in part on the 3D model of the mouth of the user. The manufacturing system manufactures the dental aligner(s) by receiving the data corresponding to the 3D model generated by the model generation system 100. The manufacturing system may manufacture the dental aligner(s) using the 3D model generated by the model generation system 100 (e.g., at step 608). The manufacturing system may manufacture the dental aligner(s) by 3D printing a physical model based on the 3D model, thermoforming a material to the physical model, and cutting the material to form a dental aligner from the physical model. The manufacturing system may manufacture the dental aligner(s) by 3D printing a dental aligner using the 3D model. In any embodiment, the dental aligner(s) are specific to the user (e.g., interface with the user's dentition) and are configured to reposition one or more teeth of the user.

Figure 7:
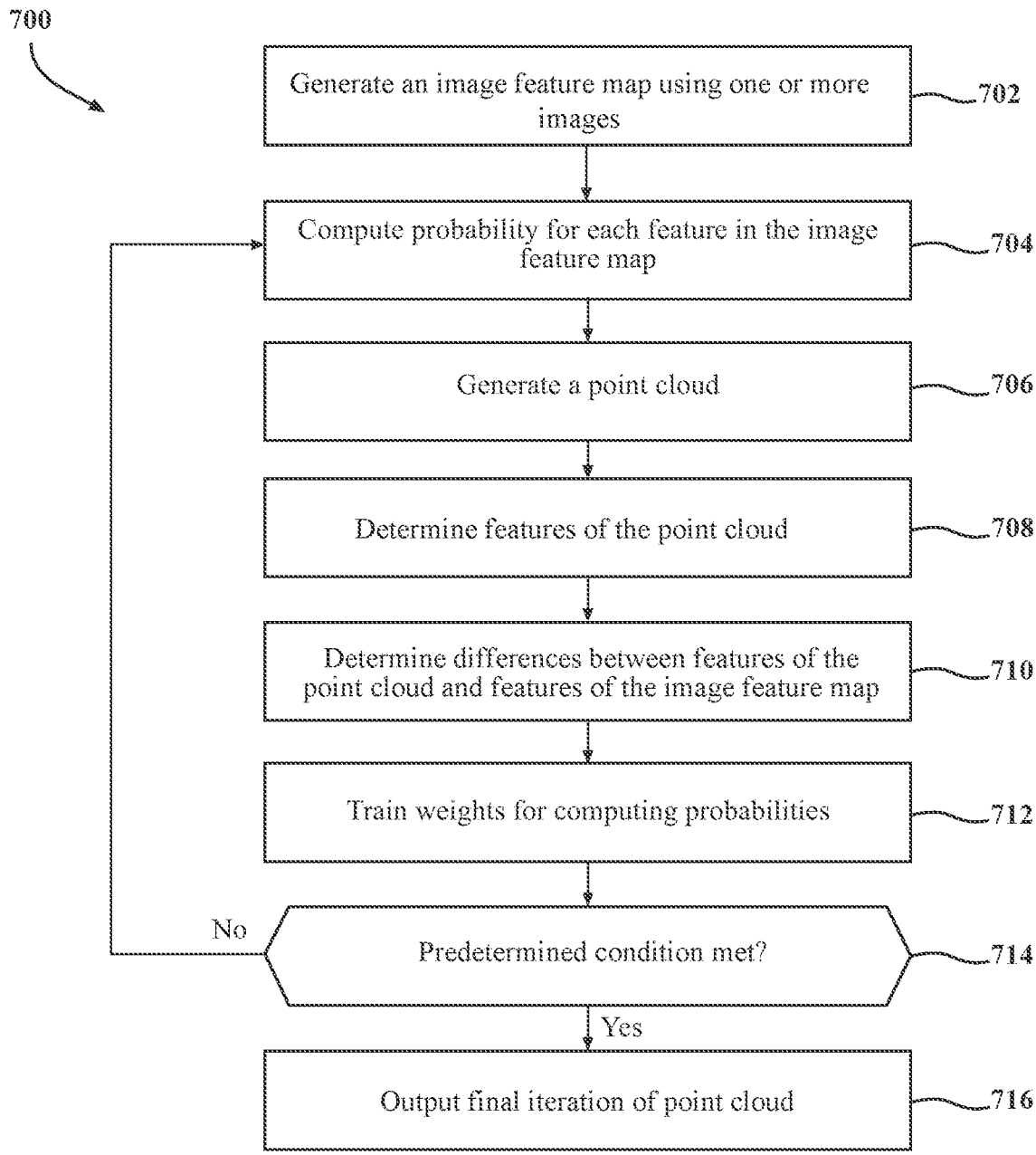
FIG. 7 is a diagram of a method of generating a point cloud from one or more 2D images, according to an illustrative embodiment.

Referring now to FIG. 7, a diagram of a method 700 of generating a point cloud 500 from one or more two-dimensional images 106 is shown according to an illustrative embodiment. The method 700 may be implemented by one or more of the components described above with reference to FIG. 1-FIG. 5C. As an overview, at step 702, the model generation system 100 generates an image feature map 300 using one or more images. At step 704, the model generation system 100 computes a probability of each feature in the image feature map 300. At step 706, the model generation system 100 generates a point cloud 500. At step 708, the model generation system 100 determines features of the point cloud 500. At step 710, the model generation system 100 determines differences between features of the point cloud and features of the image feature map 300. At step 712, the model generation system 100 trains weights for computing probabilities. At step 714, the model generation system 100 determines whether a predetermined condition is satisfied. Where the predetermined condition is not satisfied, the method 700 loops back to step 704. Where the predetermined condition is satisfied, at step 716, the model generation system 100 outputs a final iteration of the point cloud.

At step 702, the model generation system 100 generates an image feature map 300 from the one or more images 106. In some embodiments, a pre-trained image detector 102 of the model generation system 100 generates the image feature map 300 from the image(s) 106 (e.g., received at step 602 of FIG. 6). The image feature map 300 may include a classification of a plurality of portions of the image(s) 106. Each classification may correspond to a feature within the respective portion of the image(s) 106 to be represented in the point cloud.

In some embodiments the pre-trained image detector 102 may receive the image(s) 106 of the mouth of the user. The pre-trained image detector 102 portions the image(s) 106 received from the mobile device of the user. The pre-trained image detector 102 may portion the image(s) 106 into pre-determined sized portions. For instance, the pre-trained image detector 102 may portion the image(s) 106 into tiles 302. The tiles 302 may be equally sized portions of the image(s) 106. A plurality of tiles 302 corresponding to an image 106 may together form the image 106. The pre-trained image detector 102 may determine a classification of each of the portions of the image(s) 106 (e.g., of each tile 302 corresponding to an image 106). The pre-trained image detector 102 may determine the classification by parsing each portion of the image(s) 106. The pre-trained image detector 102 may parse portions of the image(s) 106 by leveraging one or more architectures, such as the MobileNet architecture. In some implementations, the pre-trained image detector 102 may include an image classifier 304, which may be embodied as a neural network. The image classifier 304 may include an input layer (e.g., configured to receive the tiles 302), one or more hidden layers including various pre-trained weights, and an output layer. The image classifier 304 may classify each of the tiles 302 based on the pre-trained weights. Each classification for a respective tile 302 may correspond to an associated feature. The pre-trained image detector 102 may generate the image feature map 300 using the portions of the image(s) 106 which include their respective classifications. For instance, following the tiles 302 being classified by the image classifier 304, the pre-trained image detector 102 may reconstruct the image(s) 106 as an image feature map 300 (e.g., by stitching together the tiles 302 to form the image feature map 300).

At step 704, the model generation system 100 computes a probability of features in the image feature map 300. In some embodiments, an LSTM encoder 108 of the model generation system 100 computes the probabilities. The LSTM encoder 108 may compute a probability for each feature of the image feature map 300 using one or more weights. The LSTM encoder 108 receives the image feature map 300 (e.g., generated at step 604). The LSTM encoder 108 parses the image feature map 300 to compute probabilities of features present in the image feature map 300. The LSTM encoder 108 may be embodied as a neural network including one or more nodes having weights which are tuned to detect certain features in an image feature map 300. The output of the neural network may be a probability of a corresponding feature in the image feature map. The LSTM encoder 108 may be tuned to detect and compute a probability of the potential features in the images 106 using the image feature map 300.

At step 706, the model generation system 100 generates a point cloud 500. In some embodiments, an output engine 110 of the model generation system 100 may generate the point cloud 500 using the probabilities (e.g., computed at step 702). The output engine 110 generates the point cloud 500 based on data from the LSTM encoder 108. The output engine 110 may generate the point cloud 500 using the probabilities which are highest. For instance, the output engine 110 may generate the point cloud 500 by parsing the data corresponding to the probabilities for each feature of the images 106. Each feature may include a corresponding probability. The output engine 110 may identify the most probable features of the images 106 (e.g., based on which probabilities are highest). The output engine 110 may generate a point cloud 500 using the most probable features of the images 106. The point cloud 500 includes a plurality of points which together define a surface contour of a 3D model. The surface contour may follow a surface of the user's dental arch such that the point cloud 500 matches, mirrors, or otherwise represents the user's dental arch.

At step 708, the model generation system 100 determines features of the point cloud 500. In some embodiments, a point cloud feature extractor 112 of the model generation system 100 determines one or more features from the point cloud 500 generated by the output engine 110 (e.g., at step 706). The point cloud feature extractor 112 may process the point cloud 500 to identify the features from the points of the point cloud 500. The point cloud feature extractor 112 may process the point cloud 500 independent of the probabilities computed by the LSTM encoder 108 and/or the image feature map 300. In this regard, the point cloud feature extractor 112 determines features from the point cloud 500 without feedback from the LSTM encoder 108. The point cloud feature extractor 112 may leverage data from one or more architectures or libraries, such as PointNet architecture, for determining features from the point cloud.

At step 710, the model generation system 100 determines differences between features of the point cloud 500 (e.g., determined at step 708) and the features of the image feature map 300 (e.g., generated at step 702). In some embodiments, an LSTM decoder 114 of the model generation system 100 determines a difference between the features determined by the point cloud feature extractor 112 and corresponding features from the image feature map 300. The LSTM decoder 114 may compare features determined by the point cloud feature extractor 112 (e.g., based on the point cloud 500) and corresponding features from the image feature map 300 (e.g., probabilities of features computed by the LSTM encoder 108). The LSTM decoder 114 may compare the features to determine how accurate the point cloud 500 computed by the output engine 110 is in comparison to the image feature map 300.

In some embodiments, the LSTM decoder 114 may compute a loss function using the features extracted from the point cloud 500 (e.g., by the point cloud feature extractor 112) and corresponding probabilities of each feature of the image feature map 300. The LSTM decoder 114 may determine the difference based on the loss function. The LSTM encoder 108 may train the weights (described in greater detail below) to minimize the loss function computed by the LSTM decoder 114.

At step 712, the model generation system 100 trains weights for computing the probabilities (e.g., used at step 704). In some embodiments, the LSTM encoder 108 of the model generation system 100 trains the one or more weights for computing the probability based on the determined difference (e.g., determined at step 710). The LSTM encoder 108 may tune, adjust, modify, or otherwise train weights of the neural network used for computing the probabilities of the features of the image feature map 300. The LSTM encoder 108 may train the weights using feedback from the LSTM decoder 114. For instance, where the LSTM decoder 114 computes a loss function of corresponding feature(s) of the image feature map 300 and feature(s) extracted from the point cloud 500, the LSTM decoder 114 may provide the loss function value to the LSTM encoder 108. The LSTM encoder 108 may correspondingly train the weights for nodes of the neural network (e.g., for that particular feature) based on the feedback. The LSTM encoder 108 may train the weights of the nodes of the neural network to minimize the loss function or otherwise limit differences between the features of the point cloud 500 and features of the image feature map 300.

At step 714, the model generation system 100 determines whether a predetermined condition is met or satisfied. In some embodiments, the predetermined condition may be a predetermined or pre-set number of iterations in which steps 704-712 are to be repeated. The number of iterations may be set by a user, operator, or manufacturer of the dental aligners, may be trained based on an optimization function, etc. In some embodiments, the predetermined condition may be the loss function satisfying a threshold. For instance, the model generation system 100 may repeat steps 704-712 until the loss function value computed by the LSTM decoder 114 satisfies a threshold (e.g., the loss function value is less than 0.1 mm). Where the model generation system 100 determines the predetermined condition is not satisfied, the method 700 may loop back to step 704. Where the model generation system 100 determines the predetermined condition is satisfied, the method 700 may proceed to step 716.

At step 716, the model generation system 100 outputs the final iteration of the point cloud 500. In some embodiments, the output engine 110 of the model generation system 100 may output the point cloud 500. The output engine 110 may output a point cloud 500 for an upper dental arch of the user and a point cloud 500 for a lower dental arch of the user. Such point clouds 500 may be used for generating a 3D model, which in turn can be used for manufacturing dental aligners for an upper and lower dental arch of the user, as described above in FIG. 6.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be X, Y, or Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, flash memory, hard disk storage) for storing data and/or computer code for completing or facilitating the various processes, layers and circuits described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data, which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the systems and methods shown in the various exemplary embodiments are illustrative only. Additionally, any element disclosed in one embodiment may be incorporated or utilized with any other embodiment disclosed herein.

What is claimed is:

1. A method comprising:
   receiving, by a model generation engine, a two-dimensional image of a dental arch of a user;
   executing, by the model generation engine, a machine learning model that is trained to receive the two-dimensional image as input and output a three-dimensional representation of the two-dimensional image, wherein in at least one iteration during training, the model generation engine:
      extracts one or more features defining at least a tooth location of a tooth of the dental arch of the user from an iteration of the three-dimensional representation of the two-dimensional image generated using the machine learning model; and
      determines a loss based on the one or more features extracted from the iteration of the three-dimensional representation of the two-dimensional image and a corresponding one or more features extracted from the two-dimensional image; and
   outputting, by the model generation engine, an output three-dimensional representation of the two-dimensional image responsive to executing the machine learning model using the two-dimensional image of the dental arch as input.

2. The method of claim 1, wherein the output three-dimensional representation of the two-dimensional image is a triangular model representing the dental arch of the user.

3. The method of claim 2, wherein the triangular model is a stereolithography file.

4. The method of claim 1, wherein the output three-dimensional representation of the two-dimensional image is a point cloud representing the dental arch of the user.

5. The method of claim 4, further comprising generating, by the model generation engine, a plurality of points of the point cloud corresponding to one or more features having a probability of being present in the two-dimensional image.

6. The method of claim 5, further comprising generating, by the model generation engine, a three-dimensional (3D) model based on the plurality of points of the point cloud.

7. The method of claim 1, wherein the output three-dimensional representation of the two-dimensional image is a three-dimensional (3D) model of the dental arch of the user.

8. The method of claim 7, further comprising manufacturing, based on the 3D model, a dental aligner specific to the user and configured to reposition one or more teeth of the user.

9. The method of claim 7, wherein the 3D model is a first 3D model, and wherein the method further comprises generating a merged model by merging the first 3D model with a second 3D model of the dental arch of the user.

10. The method of claim 7, wherein the 3D model is a first 3D model, the method further comprising comparing the first 3D model with a second 3D model.

11. The method of claim 10, wherein the second 3D model is generated based on a dental impression of the dental arch of the user.

12. The method of claim 1, wherein the two-dimensional image is multiple two-dimensional images, and wherein the multiple two-dimensional images are received by the model generation engine from a mobile device associated with the user.

13. The method of claim 1, wherein the one or more features extracted from the two-dimensional image is a feature map representing the one or more features of the two-dimensional image.

14. The method of claim 13, wherein the feature map includes a plurality of portions, and wherein each portion of the plurality of portions is classified based on a respective feature within the portion of the two-dimensional image as corresponding to a respective characteristic of a dentition of the user.

15. The method of claim 1, wherein the one or more features are extracted from the two-dimensional image by executing a feature extractor model.

16. The method of claim 1, wherein the one or more features are extracted from the iteration of the three-dimensional representation of the two-dimensional image by executing a feature extractor model.

17. The method of claim 1, wherein the machine learning model is trained until the loss calculated based on the one or more features extracted from the iteration of the three-dimensional representation of the two-dimensional image and the corresponding one or more features extracted from the two-dimensional image satisfies a threshold.

18. The method of claim 1, wherein the machine learning model is trained until a threshold number of iterations are performed.

19. A method comprising:
   identifying, by an image detector based on a two-dimensional image of a dental arch of a user, one or more features in a portion of a plurality of portions of the two-dimensional image;
   extracting, by a model generation engine, one or more features defining at least a tooth location of a tooth of the dental arch of the user from an iteration of a three-dimensional representation of the two-dimensional image, the three-dimensional representation of the two-dimensional image generated by executing a machine learning model based on the two-dimensional image;
   updating, by the model generation engine, the machine learning model based on a loss calculated based on the one or more features in the portion of the plurality of portions of the two-dimensional image, a corresponding probability of the one or more features, and the one or more features extracted from the iteration of the three-dimensional representation of the two-dimensional image; and
   outputting, by the model generation engine, the three-dimensional representation of the two-dimensional image based on the updated model.

20. The method of claim 19, wherein the three-dimensional representation of the two-dimensional image is a triangular model representing the dental arch of the user.

21. The method of claim 20, wherein the triangular model is a stereolithography file.

22. The method of claim 19, wherein the three-dimensional representation of the two-dimensional image is a point cloud representation comprising one or more points in space corresponding to the respective probability of the one or more features.

23. The method of claim 22, wherein the one or more points in space are determined by applying the machine learning model to the one or more features in the portion of the plurality of portions of the two-dimensional image.

24. The method of claim 22, further comprising, generating, by the model generation engine based on the one or more points in space, a three-dimensional (3D) model of the dental arch of the user.

25. The method of claim 23, further comprising manufacturing, based on the 3D model, a dental aligner specific to the user and configured to reposition one or more teeth of the user.

26. The method of claim 19, wherein the one or more features in the portion of the plurality of portions of the two-dimensional image is a feature map representing one or more features of the two-dimensional image.

27. The method of claim 26, wherein the feature map includes the plurality of portions, and wherein each portion of the plurality of portions is classified based on a respective feature within the portion of the two-dimensional image as corresponding to a respective characteristic of a dentition of the user.

28. The method of claim 19, wherein the model generation engine updates the machine learning model based on a difference between the corresponding probability of the one or more features in the portion of the plurality of portions and the corresponding probability of the one or more features identified from the three-dimensional representation of the two-dimensional image.

29. A system comprising:
   a processing circuit comprising a processor communicably coupled to a non-transitory computer readable medium, wherein the processor is configured to execute instructions stored on the non-transitory computer readable medium that cause the processor to:
   receive a two-dimensional image of a dental arch of a user;
   execute a machine learning model that is trained to receive the two-dimensional image as input and output a three-dimensional representation of the two-dimensional image, wherein in at least one iteration during training, the processing circuit:
      extracts one or more features defining at least a tooth location of a tooth of the dental arch of the user from an iteration of the three-dimensional representation of the two-dimensional image generated using the machine learning model; and
      determines a loss based on the one or more features extracted from the iteration of the three-dimensional representation of the two-dimensional image and a corresponding one or more features extracted from the two-dimensional image, wherein the one or more features extracted from the iteration of the three-dimensional representation of the two-dimensional image correspond to one or more features having a probability of being present in the two-dimensional image and the one or more features extracted from the two-dimensional image correspond to the one or more features having a probability of being present in the two-dimensional image; and
   output an output three-dimensional representation of the two-dimensional image responsive to executing the machine learning model using the two-dimensional image of the dental arch as input.

30. The system of claim 29, wherein the one or more features are extracted from the iteration of the three-dimensional representation of the two-dimensional image by executing a feature extractor model.

* * * * *